United States Patent [19]

Sasuta

[11] Patent Number: 4,972,460
[45] Date of Patent: Nov. 20, 1990

[54] AUTOMATIC EQUIVALENT TEMPORARY TALKGROUP ASSIGNMENT IN A ROAMING TRUNKING ENVIRONMENT

[75] Inventor: Michael D. Sasuta, Palatine, Ill.

[73] Assignee: Motorola, Inc., Schaumburg, Ill.

[21] Appl. No.: 414,979

[22] Filed: Sep. 29, 1989

[51] Int. Cl.⁵ .......................................... H04M 11/00
[52] U.S. Cl. ...................................... 379/60; 379/63; 455/17
[58] Field of Search ..................... 379/58, 59, 60, 62, 379/63; 455/17, 33

[56] References Cited

U.S. PATENT DOCUMENTS

| | | | |
|---|---|---|---|
| 4,646,345 | 2/1987 | Zdunek et al. | 379/62 |
| 4,723,264 | 2/1988 | Sasuta et al. | 379/58 |
| 4,811,380 | 3/1989 | Spear | 379/60 |
| 4,833,701 | 5/1989 | Comroe | 379/60 |

Primary Examiner—Jin F. Ng
Assistant Examiner—Jhancy Augustus
Attorney, Agent, or Firm—Darleen J. Stockley

[57] ABSTRACT

A trunked communication system utilizes talkgroup synchronization for roaming communication units. By automatically matching the communication unit's talkgroup in a first area-wide system with an talkgroup in a second area-wide system, the communication system facilitates rapid association with a desired talkgroup.

33 Claims, 5 Drawing Sheets

400

AUTOMATIC EQUIVALENT TEMPORARY TALKGROUP ASSIGNMENT IN A ROAMING TRUNKING ENVIRONMENT

TECHNICAL FIELD

This invention relates generally to trunked communication systems, and more particularly to trunked communication systems that enable a communication unit to roam from system to system, and is more particularly directed to a roaming communication unit having the capability of automatically associating with at least one temporary talkgroup in the second system that is equivalent to a talkgroup in its home system.

BACKGROUND OF THE INVENTION

Roaming communication units utilizing a communication network made up of a central hub controller linked to area-wide system controllers are known. Roaming capabilities typically allow the communication unit to maintain communication with the network while roaming from system to system, but do not encompass talkgroup synchronization as the communication unit moves from one system to another.

U.S. Pat. No. 4,833,701, issued to Comroe et al. and assigned to Motorola Inc., is entitled "Trunked Communication System with Nationwide Roaming Capability" (hereinafter "Comroe"). It discloses a method and system for permitting communication units moving from one communication system area to another to obtain roaming IDs and to continue to operate in the second system area under an assigned roaming ID. It also discloses that a roaming communication unit transmits its individual ID and its home system ID to the local computer for the second system when requesting a roaming ID. It further discloses that the local computer assigns and cross-references a roaming ID to the communication unit ID, transmits the roaming ID to the communication unit, and transmits the communication unit ID and local system ID to the hub controller.

In the Comroe patent, each roaming ID is assigned to the communication unit without cross-referencing to a previously assigned talkgroup. There nevertheless exists a need for a trunked communication system that facilitates continued communication with the same talkgroup as a roaming communication unit leaves one system and enters another.

SUMMARY OF THE INVENTION

This need and others are substantially met by the communication system method discussed herein. The method comprises the steps of determining that communication with a first trunked communication system has been lost, providing a communication unit composite ID to the resource controller of a second communication system, receiving at least one equivalent roaming temporary talkgroup assignment ID, storing the equivalent roaming temporary talkgroup assignment ID, operating thereafter in the second trunked communication system under the equivalent roaming temporary talkgroup assignment ID until the ID is deregistered, and the resource controller thereafter returning the temporary talkgroup IDs to the pool of available IDs for temporary talkgroups in the second system.

In one embodiment, a communication unit operating in one system and utilizing at least one talkgroup therein, roams to another system. Detecting significant decoding errors in its communication signal from the first system, the communication unit scans for another control resource. Upon finding a new control resource in a second system, the communication unit transmits a composite ID, containing its individual ID, its home system ID, and at least one previously assigned talkgroup ID to the resource controller in the second system. The resource controller utilizes a local computer to automatically match the previously assigned talkgroup or talkgroups with equivalent talkgroups in the second system and transmits an equivalent roaming temporary talkgroup placement ID for each newly assigned talkgroup to the communication unit.

The communication unit stores and operates with the equivalent roaming temporary talkgroup assignment IDs until one of: transmission of at least one deregistration signal to or from the resource controller; the communication unit roams to a new system; the communication unit shuts down communication; or, a predetermined period of time elapses during which the communication units that belong to the talkgroup fail to utilize the equivalent roaming temporary talkgroup.

BEST MODE FOR CARRYING OUT THE INVENTION

Figure 1:
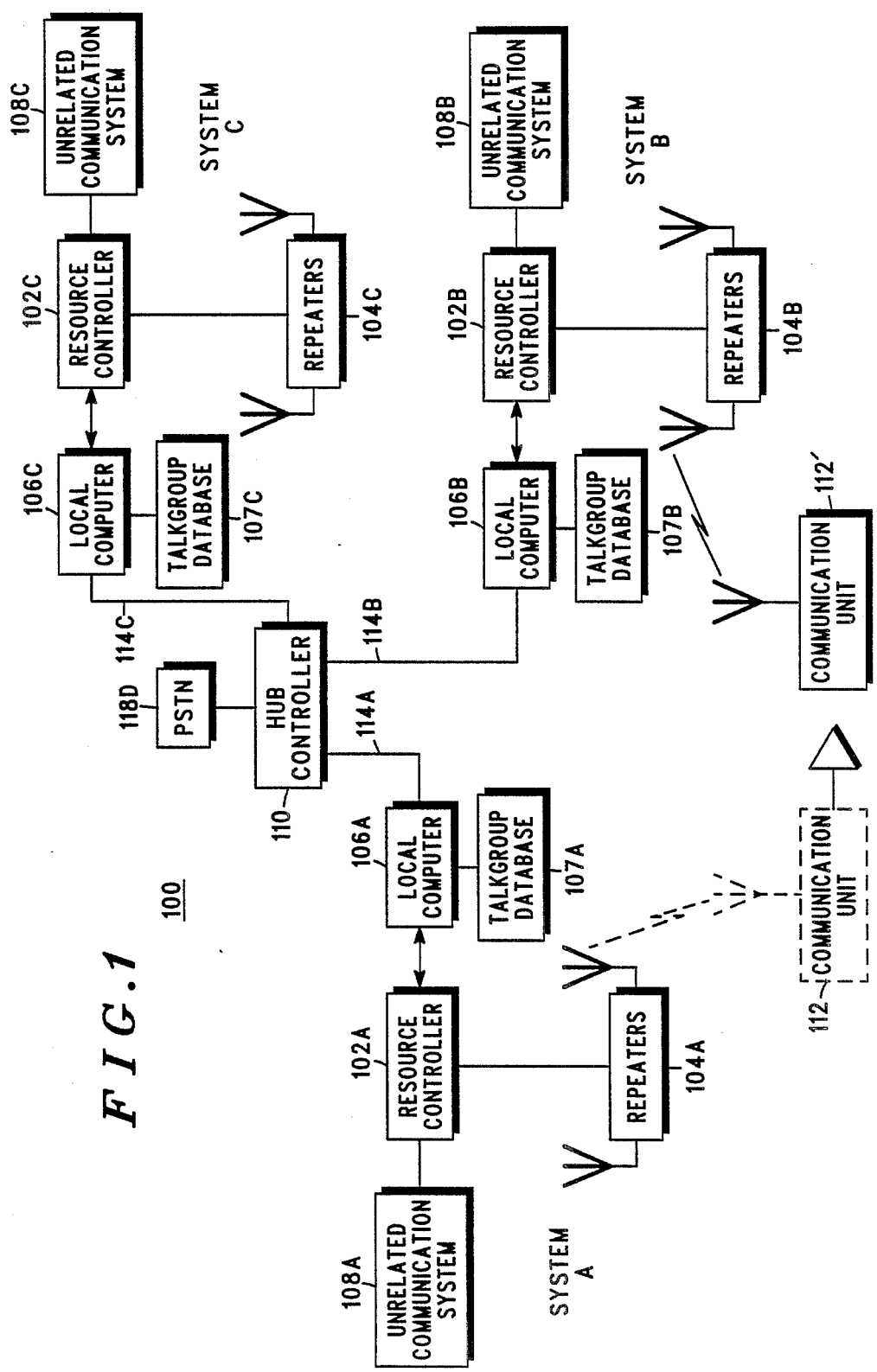
FIG. 1 is a block diagram of a networked trunked communication system which operates in accordance with the present invention.

A plurality of trunked communication systems (depicted as A, B, and C, but not limited to that number) providing automatic equivalent temporary talkgroup assignments in accordance with the invention are set forth in FIG. 1 as depicted generally by the numeral 100. In one embodiment this plurality of systems (100) is directed by a central hub controller (110) and a plurality of resource controllers (shown as 102A, 102B, and 102C, but not limited to that number) that coordinate and catalog automatic assignments of temporary talkgroup assignment IDs. The hub controller (110) and resource controllers (102A, 102B, 102C) allocate repeaters (shown as 104A, 104B, 104C, but where a substantially larger number may be present) among a plurality of communication units, assign unit identification (ID) codes and ID codes of home systems. The system herein utilizes a 16 bit binary information storage, retrieval, and transmission database for communication units, limiting the number of those units to 64K. In addition, the resource controllers (102A, 102B, and 102C) catalog, coordinate, and allocate talkgroup IDs. The 12 bit binary information storage, retrieval, and transmission database for talkgroups limits the number of those groups to 4K. Local computers (106A, 106B, 106C, but not limited to that number) link the resource controllers (102A, 102B, 102C) to the hub controller (110).

As a communication unit (112) belonging to a talkgroup in one communication system (A) roams from that communication system (A) to a second communication system (B), the communication unit (now 112') determines that decoding errors in signals received from the first communication system are sufficiently large enough to determine that it is no longer receiving the home system, and hence is no longer capable of communicating with its talkgroup. To continue to communicate with at least one talkgroup, the communication unit (112') transmits a composite ID, consisting of an individual ID, a home system ID, and a talkgroup ID, to the resource controller (102B) of the second communication system as a request for at least one temporary talkgroup assignment ID that corresponds to an equivalent talkgroup. The resource controller (102B) searches its talkgroup base (107B) for an equivalent talkgroup in its system (B). If a previously assigned equivalent talkgroup exists, the controller transmits an equivalent temporary talkgroup assignment ID to the communication unit (112'). In addition, the resource controller (102B) may utilize a local computer (106B) to forward the composite ID and the equivalent temporary talkgroup assignment ID to the hub controller (110), which serves as a central data storage and retrieval point.

The communication unit (112') may store the equivalent temporary talkgroup assignment ID and operate with the ID until: (a) it transmits a deregistration code to its present system (B); (b) it roams to a new system; (c) it shuts down communication with its present system (B); or (d) a predetermined period of time elapses during which no communication units assigned to the equivalent roaming temporary talkgroup have used the talkgroup ID. When (b) or (c) occurs, the communication unit sends a deregistration code to the resource controller, triggering deregistration of the temporary talkgroup assignment ID by the resource controller (102B). When (d) occurs, the resource controller (102B) sends a deregistration code to the communication unit (112').

Figure 2:
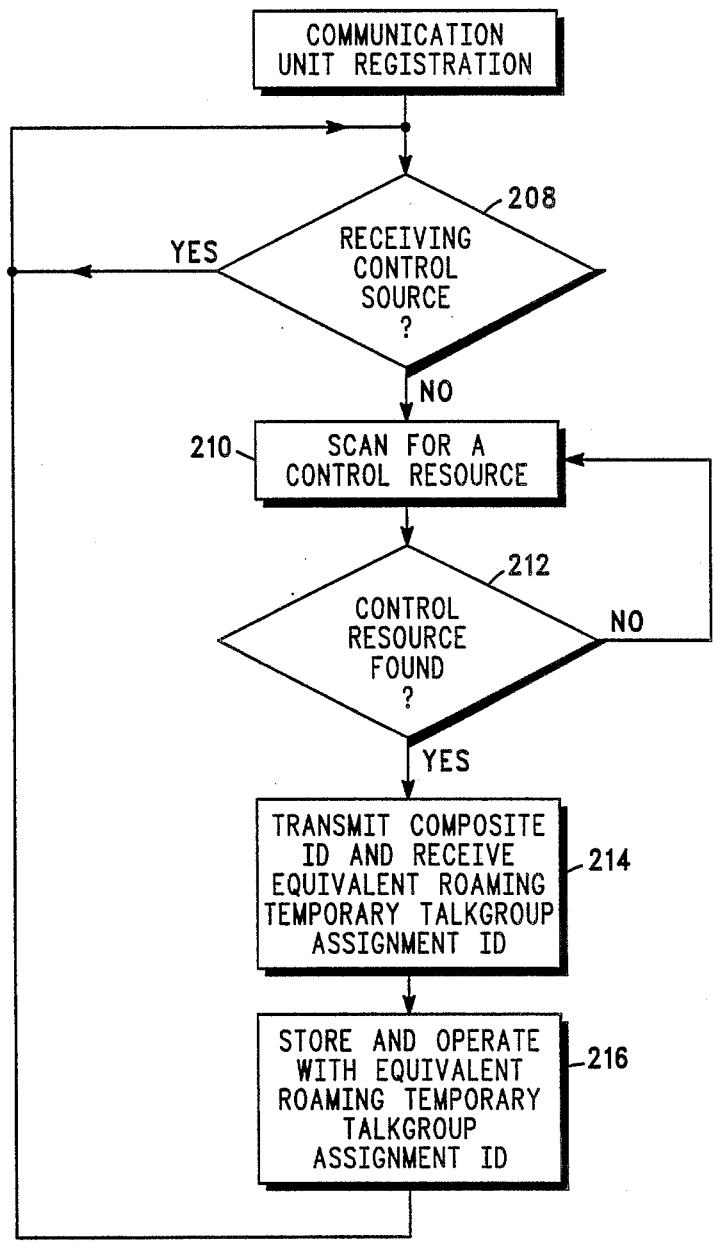
FIG. 2 is a flow diagram illustrating the steps executed by a roaming communication unit to achieve automatic assignment to an equivalent temporary talkgroup.

FIG. 2 illustrates the steps executed by a roaming communication unit (112) to achieve automatic assignment to at least one equivalent temporary talkgroup, generally depicted by the numeral 200. Pursuant to Comroe, the roaming communication unit (112) determines whether a control resource is being received (208), and in the event that a control resource is not being received, scans for a control resource (210); in the event that a control resource is being received (212), the communication unit (112) will operate within that control resource system. When a control resource is located, the communication unit (112) transmits the composite ID, containing its individual communication unit ID, its home system ID, and its talkgroup affiliations with a first system, and receives at least one equivalent roaming temporary talkgroup assignment ID (214). The communication unit (now 112') then stores and operates with at least this one equivalent roaming temporary talkgroup assignment ID (216) for the time being.

Figure 3A:
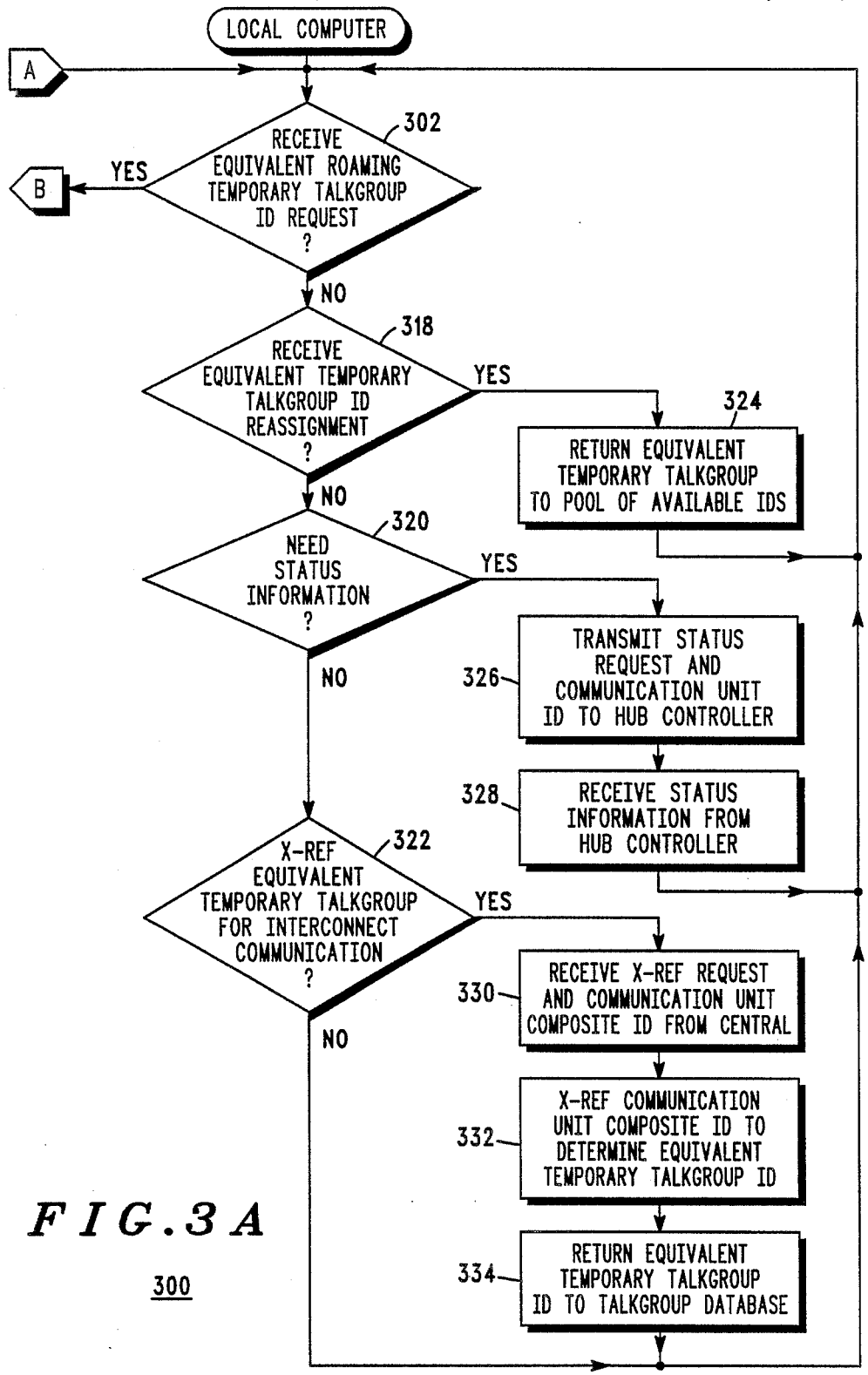
FIGS. 3A and 3B represent a flow diagram illustrating the steps executed by a local computer of FIG. 1.
Figure 3B:
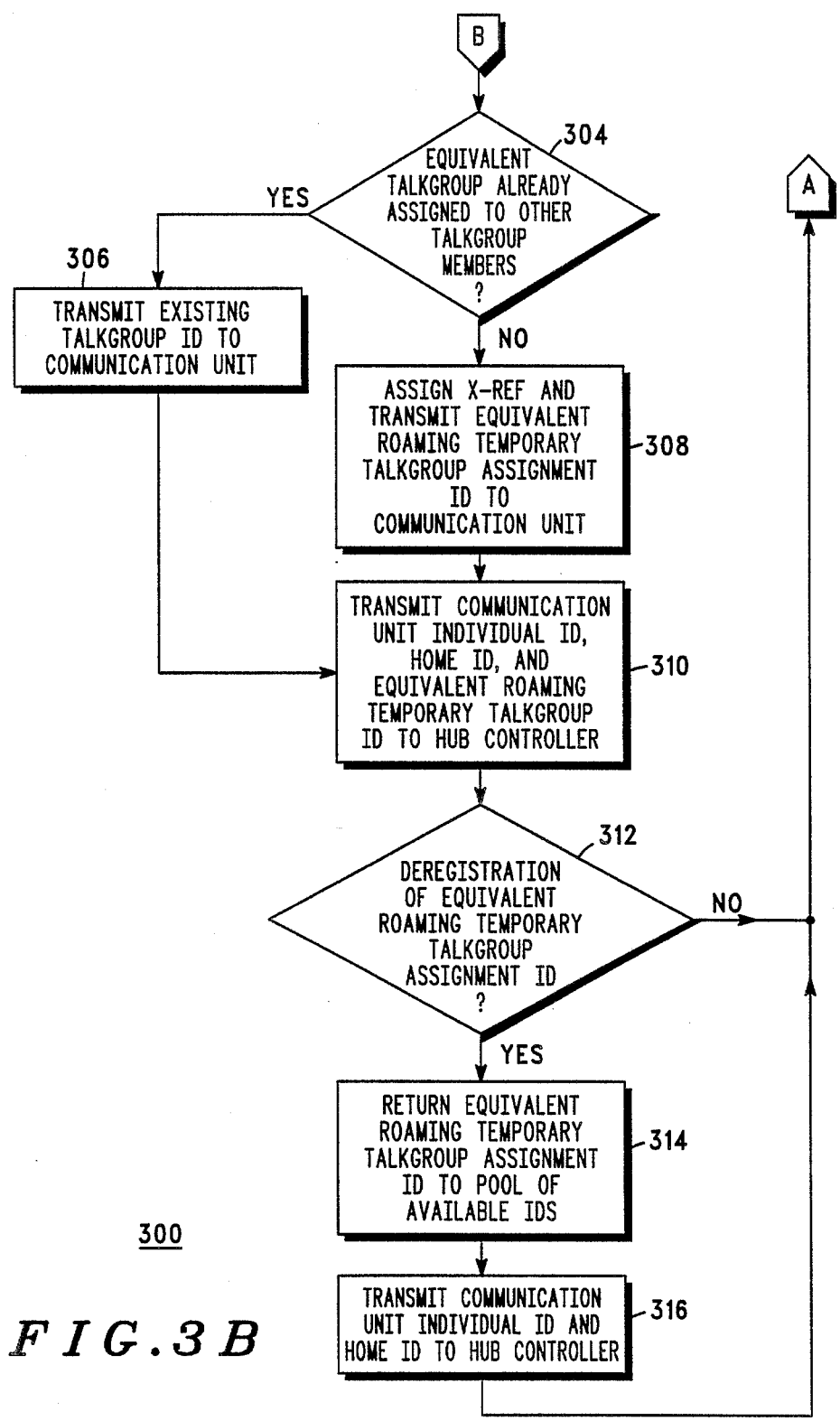

FIG. 3A and 3B illustrate the steps executed by the local computer (106B), as generally depicted by the numeral 300. When the local computer (106B) receives an equivalent roaming talkgroup ID request (302), it determines whether or not an equivalent talkgroup has already been assigned to other talkgroup members (304). If so, it transmits the existing talkgroup ID to the communication unit (306), then transmits the communication unit individual ID, home ID, and equivalent roaming temporary talkgroup ID (310) to the hub controller (110). If not, the local computer (106B) assigns, cross references and transmits the equivalent roaming temporary talkgroup assignment ID (308) to the communication unit (112'). Thereafter the local computer (106B) transmits the communication unit individual ID, home ID, and equivalent roaming temporary talkgroup ID (310) to the hub controller (110).

The local computer (106B) then determines whether or not the equivalent temporary talkgroup ID is deregistered (312). If not, the local computer (106B) continues to determine whether or not an equivalent roaming temporary talkgroup ID has been requested (302). If deregistration of the equivalent temporary talkgroup ID has taken place, the local computer (106B) returns the equivalent temporary talkgroup ID to the pool of available IDs (314); it then transmits the communication unit individual ID and home ID to the hub controller (316). When no equivalent roaming temporary talkgroup ID request is received (302) by the local computer (318), it checks to see if it has received a reassignment instruction for an equivalent roaming temporary talkgroup ID from the hub controller (110). The reassignment instruction would typically occur due to the cessation of operation when one of the four actions, listed a-d above, occurred. If reassignment has occurred, the local computer returns the equivalent temporary talkgroup ID to the pool of available IDs (324) and loops back to determine whether or not an equivalent roaming temporary talkgroup request has been requested. If reassignment has not occurred, the local computer (106B) determines whether it needs status information (320) from the hub controller (110). If so, it transmits the status request and communication unit composite ID (326) to the hub controller (110), then receives the status information (328) stating the system ID of the trunked system that the communication unit is operating within from the hub controller (110) and recycles to determine whether or not it has received an equivalent roaming temporary talkgroup ID request (302).

If no status information is needed, the local computer (106B) cross references to determine whether or not a request has been made to set up an interconnect communication (322) with the communication unit (112'). If not, it recycles to determine whether or not an equivalent roaming temporary talkgroup ID request (302) has been made. If an interconnect communication is requested, it receives the cross-reference request and communication unit composite ID from the resource controller (330). Next, it cross-references the communication unit composite ID to determine the equivalent temporary talkgroup ID (332), and returns the equivalent temporary talkgroup ID (334) to the resource controller (102B) so that the resource controller may establish an unrelated system communication interconnect. When the communication is completed, the local computer (106B) recycles to determine whether or not a request has been made to receive an equivalent roaming temporary talkgroup request (302).

Figure 4:
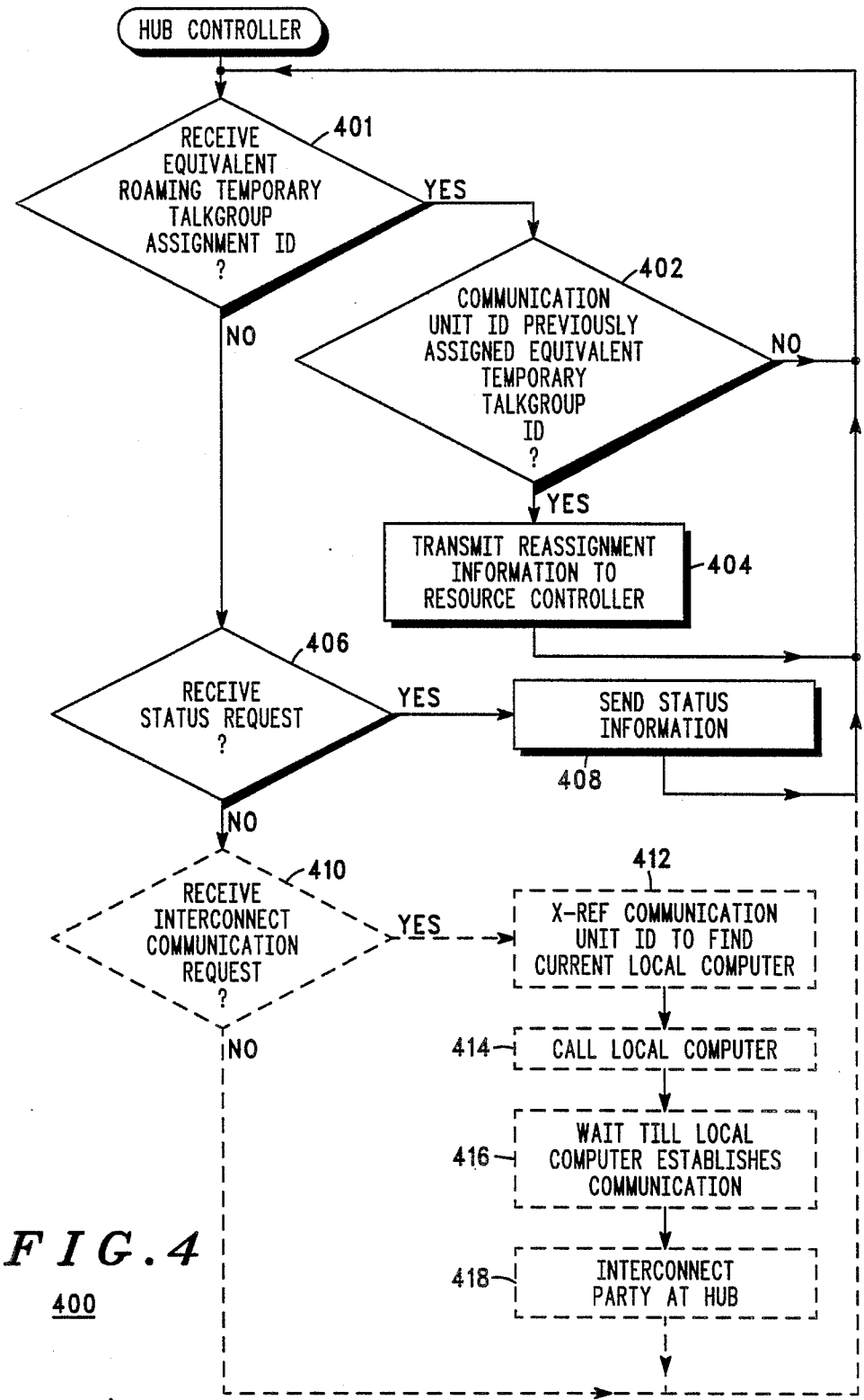
FIG. 4 is a flow diagram illustrating the steps executed by the hub controller of FIG. 1.

FIG. 4 illustrates the steps executed by the hub controller (110) of FIG. 1, as depicted generally by the numeral 400. The hub controller (110) determines whether or not a request for an equivalent roaming temporary talkgroup assignment ID has been received (401). If so, it determines whether or not the communication unit ID has previously been assigned an equivalent roaming temporary talkgroup assignment ID (402). If not, it recycles to the determination of whether it has received a request for an equivalent roaming temporary talkgroup assignment ID (401). If a previous equivalent roaming temporary talkgroup assignment ID has been assigned (402), it may utilize the local computer (106B) to transmit re-assignment information (404) to the resource controller (102B), then it may recycle to the determination of whether or not a request for an equivalent roaming temporary talkgroup assignment ID (401) has been received.

If no request for an equivalent roaming temporary talkgroup assignment ID has been received (401), the hub controller (110) determines whether or not a status request has been received (406) from the resource controllers or an unrelated communication system (108A, 108B, 108C). If so, it sends status information (408) for the communication unit (112') and recycles to the determination of whether or not it has received a request for an equivalent roaming temporary talkgroup assignment ID (401). If no status request has been received, the hub controller (110) may alternatively determine whether or not an unrelated communication system interconnect request has been received (410). If not, it recycles to the determination of whether or not an equivalent roaming temporary talkgroup assignment ID has been received (401). If an unrelated communication interconnect request has been received (410), the hub controller (110) cross-references the communication unit ID to find the local system ID that the communication unit (112') is presently assigned to (412), and calls (414) the local system (B) via the unrelated communication system (108B). The hub controller (110) waits until the local system has cross-referenced the communication unit ID to the equivalent roaming temporary talkgroup assignment ID and establishes an interconnect communication (416) with the communication unit (112'). The hub controller (110) interconnects the unrelated communication system party to the resource controller (102B) where the communication unit (112') is roaming, to permit the communication to be implemented (418). When the call is finished, the hub controller (110) recycles to the determination of whether or not a request for an equivalent roaming temporary talkgroup assignment ID has been received (401). Telephone interconnection may be established in an alternative fashion, as set forth in Comroe.

What is claimed is:

1. A method for a roaming communication unit to associate automatically with at least one talkgroup in a second trunked communication system that is equivalent to at least one talkgroup in a first trunked communication system, comprising the steps of:
   (A) determining that communication with a resource controller in the first trunked communication system has been lost;
   (B) providing a communication unit composite ID of the roaming communication unit to a second resource controller;
   (C) receiving at least one equivalent roaming temporary talkgroup assignment ID;
   (D) storing the at least one equivalent roaming temporary talkgroup assignment ID;
   (E) operating, thereafter, in the second trunked communication system under the at least one equivalent roaming temporary talkgroup assignment ID until a predetermined event occurs.

2. The method of claim 1, wherein the step of determining that communication with a talkgroup in the first trunked communication system has been lost comprises determining that reception of an information signal from a predetermined communication resource is not practicable due to an unacceptably high error rate.

3. The method of claim 1, wherein the step of providing the communication unit composite ID of the roaming communication unit to the resource controller comprises the steps of:
   (A) providing an individual ID of the communication unit;
   (B) providing a home ID of the communication unit; and
   (C) providing a talkgroup ID of the communication unit in the first trunked communication system.

4. The method of claim 1, wherein the step of receiving at least one equivalent roaming temporary talkgroup assignment ID comprises receiving at least one identification code from the second trunked communication system wherein the at least one identification code for a temporary talkgroup in the second trunked communication system corresponds to an equivalent talkgroup in the first trunked communication system.

5. The method of claim 1, wherein the step of storing at least one equivalent roaming temporary talkgroup assignment ID comprises storing at least one equivalent roaming temporary talkgroup assignment ID in the communication unit.

6. The method of claim 1, wherein the step of storing at least one equivalent roaming temporary talkgroup assignment ID comprises storing at least one equivalent roaming temporary talkgroup assignment ID in a local computer in the second trunked communication system.

7. The method of claim 1, wherein the step of storing at least one equivalent roaming temporary talkgroup assignment ID comprises storing at least one equivalent roaming temporary talkgroup assignment ID by utilizing a local computer to forward the IDs to a central hub controller, a data storage and retrieval center.

8. The method of claim 1, wherein the step of operating, thereafter, in the second trunked communication system under at least one equivalent roaming temporary talkgroup assignment ID until a predetermined event occurs comprises:
   (A) maintaining communication with at least one temporary talkgroup in the second trunked communication system until the communication unit transmits at least one deregistration message to a resource controller;
   (B) receiving at least one deregistration message by the resource controller; and
   (C) when the communication unit is a last unit being deregistered in a communication unit temporary talkgroup, the resource controller returning the deregistered communication unit temporary talkgroup ID to the pool of available IDs for temporary talkgroups for the second system.

9. The method of claim 1, wherein the step of operating, thereafter, in the second trunked communication system under at least one equivalent roaming temporary talkgroup assignment ID until a predetermined event occurs comprises:
   (A) maintaining communication with at least one temporary talkgroup in the second trunked communication system until the communication unit shuts down, thereby transmitting a deregistration message to a resource controller;
   (B) receiving the deregistration message by the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

10. The method of claim 1, wherein the step of operating thereafter, in the second trunked communication system under at least one equivalent roaming temporary talkgroup assignment ID until a predetermined event occurs comprises:

(A) maintaining communication with at least one temporary talkgroup in the second trunked communication system until a predetermined period of time elapses during which none of the members of an equivalent temporary talkgroup utilize the equivalent roaming temporary talkgroup;

(B) receiving at least one deregistration message from the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

11. The method of claim 1, wherein the step of operating, thereafter, in the second trunked communication system under at least one equivalent roaming temporary talkgroup assignment ID until a predetermined event occurs comprises:

(A) maintaining communication with at least one temporary talkgroup in the second trunked communication system until the communication unit roams to a new system;

(B) receiving at least one deregistration message by the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

12. A method for a roaming communication unit to associate automatically with at least one talkgroup in a second trunked communication system that is equivalent to at least one talkgroup in a first trunked communication system, comprising the steps of:

(A) determining that a roaming communication unit utilizing a talkgroup in a first trunked communication system desires to communicate with an equivalent roaming temporary talkgroup in a second system;

(B) providing a communication unit composite ID of the roaming communication unit to a second resource controller;

(C) determining that an equivalent roaming temporary talkgroup is available in a second system that the communication unit is capable of receiving;

(D) receiving at least one equivalent roaming temporary talkgroup assignment ID;

(E) storing the at least one equivalent roaming temporary talkgroup assignment ID;

(F) operating, thereafter, in the second trunked communication system under the at least one equivalent roaming temporary talkgroup assignment ID until a predetermined event occurs.

13. The method of claim 12, wherein the step of providing the communication unit composite ID of the roaming communication unit to the resource controller comprises the steps of:

(A) providing an individual ID of the communication unit;

(B) providing a home ID of the communication unit; and (C) providing a talkgroup ID of the communication unit in a first trunked communication system.

14. The method of claim 12, wherein the step of determining that an equivalent roaming temporary talkgroup is available in a second system that the communication unit is capable of receiving comprises the steps of:

(A) determining whether an equivalent temporary talkgroup is available in a second system by utilizing the data stored in the hub controller; and (B) determining that reception of an information signal from a predetermined communication resource is practicable due to an acceptably low error rate.

15. The method of claim 12, wherein the step of receiving at least one equivalent roaming temporary talkgroup assignment ID comprises receiving at least one identification code from the second trunked communication system wherein the at least one identification code for a temporary talkgroup in the second trunked communication system corresponds to an equivalent talkgroup in the first trunked communication system.

16. The method of claim 12, wherein the step of storing at least one equivalent roaming temporary talkgroup assignment ID comprises storing at least one equivalent roaming temporary talkgroup assignment ID in the communication unit.

17. The method of claim 12, wherein the step of storing at least one equivalent roaming temporary talkgroup assignment ID comprises storing at least one equivalent roaming temporary talkgroup assignment ID in a local computer in the second trunked communication system.

18. The method of claim 12, wherein the step of storing at least one equivalent roaming temporary talkgroup assignment ID comprises storing at least one equivalent roaming temporary talkgroup assignment ID by utilizing a local computer to forward the IDs to a central hub controller, a data storage and retrieval center.

19. The method of claim 12, wherein the step of operating, thereafter, in the second trunked communication system under at least one equivalent roaming temporary talkgroup assignment ID until a predetermined event occurs comprises:

(A) maintaining communication with at least one temporary talkgroup in the second trunked communication system until the communication unit transmits at least one deregistration message to a resource controller;

(B) receiving at least one deregistration message by the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

20. The method of claim 12, wherein the step of operating, thereafter, in the second trunked communication system under at least one equivalent roaming temporary talkgroup assignment ID until a predetermined event occurs comprises:

(A) maintaining communication with at least one temporary talkgroup in the second trunked communication system until the communication unit shuts down, thereby transmitting a deregistration message to a resource controller;

(B) receiving the deregistration message by the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

21. The method of claim 12, wherein the step of operating, thereafter, in the second trunked communication system under at least one equivalent roaming temporary talkgroup assignment ID until a predetermined event occurs comprises:

(A) maintaining communication with at least one temporary talkgroup in the second trunked communication system until a predetermined period of time elapses during which none of the members of an equivalent temporary talkgroup utilize the equivalent roaming temporary talkgroup;

(B) receiving at least one deregistration message from the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

22. The method of claim 12, wherein the step of operating, thereafter, in the second trunked communication system under at least one equivalent roaming temporary talkgroup assignment ID until a predetermined event occurs comprises:

(A) maintaining communication with at least one temporary talkgroup in the second trunked communication system until the communication unit roams to a new system;

(B) receiving at least one deregistration message by the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

23. In a network of trunked communication systems constructed and arranged to support communication units roaming from system to system and having a resource controller computer for communicating with at least two trunked communication systems, and each of the at least two trunked communication systems having:
one or more trunked repeaters;
resource controller means for allocating said one or more trunked repeaters among a plurality of communication units, and for communicating information with at least some of the one or more trunked repeaters, and including means for transmitting a predetermined code word on the selected one of the one or more trunked repeaters;
means for communicating with the resource controller means and for assigning identification codes to roaming communication units; and
means for interfacing with an unrelated communication network, a method for a roaming communication unit to associate automatically with at least one temporary talkgroup in a second trunked communication system that is equivalent to at least one talkgroup in a first trunked communication system, comprising the steps of:

(A) determining that communication with the first trunked communication system has been lost;

(B) providing a composite ID of the roaming communication unit to the resource controller in the second trunked communication system;

(C) receiving at least one equivalent roaming temporary talkgroup assignment ID;

(D) storing the at least one equivalent roaming temporary talkgroup assignment ID; and (E) operating, thereafter, in the second trunked communication system under at least one equivalent roaming temporary talkgroup assignment ID until a predetermined event occurs.

24. The method of claim 23, wherein the step of determining that communication with at least one talkgroup in the first trunked communication system has been lost comprises determining that reception of at least one information signal from a predetermined communication channel is not practicable due to an unacceptably high error rate.

25. The method of claim 23, wherein the step of providing the composite ID of the roaming communication unit to the resource controller comprises the steps of:

(A) providing the individual ID of the communication unit;

(B) providing the home ID of the communication unit; and (C) providing the talkgroup ID of the communication unit in the first trunked communication system.

26. The method of claim 23, wherein the step of receiving at least one equivalent roaming temporary talkgroup assignment ID comprises receiving at least one identification code from the second trunked communication system wherein at least one identification code for a temporary talkgroup in the second trunked communication system corresponds to at least one equivalent talkgroup in the first trunked communication system.

27. The method of claim 23, wherein the step of storing at least one equivalent roaming temporary talkgroup assignment ID comprises storing at least one equivalent roaming temporary talkgroup assignment ID in the communication unit.

28. The method of claim 23, wherein the step of storing at least one equivalent roaming temporary talkgroup assignment ID comprises storing at least one equivalent roaming temporary talkgroup assignment ID in a local computer.

29. The method of claim 23, wherein the step of storing at least one equivalent roaming temporary talkgroup assignment ID comprises utilizing a local computer to transfer at least one equivalent roaming temporary talkgroup assignment ID to a central hub controller, a data storage and retrieval center.

30. The method of claim 23, wherein the step of operating, thereafter, in the second trunked communication system under at least one equivalent roaming temporary talkgroup assignment ID until a predetermined event occurs comprises the steps of:

(A) maintaining communication with at least one temporary talkgroup in the second trunked communication system until transmission of at least one deregistration signal to the resource controller;

(B) receiving a deregistration message for each deregistered equivalent roaming temporary talkgroup assignment ID from the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

31. The method of claim 23, wherein the step of operating, thereafter, in the second trunked communication system under at least one equivalent roaming temporary talkgroup assignment ID until a predetermined event occurs comprises the steps of:

(A) maintaining communication with at least one temporary talkgroup in the second trunked communication system until the communication unit shuts down, thereby transmitting at least one deregistration message to a resource controller;

(B) receiving at least one deregistration message by the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

32. The method of claim 23, wherein the step of operating, thereafter, in the second trunked communication system under at least one equivalent roaming temporary talkgroup assignment ID until a predetermined event occurs comprises the steps of:

(A) maintaining communication with at least one temporary talkgroup in the second trunked communication system until a predetermined period of time elapses during which none of the members of a given equivalent temporary talkgroup utilize the equivalent roaming temporary talkgroup;

(B) receiving at least one deregistration message from the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

33. The method of claim 23, wherein the step of operating, thereafter, in the second trunked communication system under at least one equivalent roaming temporary talkgroup assignment ID until a predetermined event occurs comprises the steps of:

(A) maintaining communication with at least one temporary talkgroup in the second trunked communication system until the communication unit roams to a new system;

(B) receiving at least one deregistration message by the resource controller; and (C) when the communication unit is a last unit being deregistered in a communication unit temporary talkgroup, the resource controller returning the deregistered communication unit temporary talkgroup ID to the pool of available IDs for temporary talkgroups for the second system.

* * * * *